Oct. 11, 1949.　　　　F. T. ROMAN　　　　2,484,744

FISH LURE

Filed April 18, 1946

INVENTOR
FLOYD T. ROMAN
BY Chapin & Neal
ATTORNEYS

Patented Oct. 11, 1949

2,484,744

UNITED STATES PATENT OFFICE 2,484,744

FISH LURE

Floyd T. Roman, Three Rivers, Mass.

Application April 18, 1946, Serial No. 663,014

1 Claim. (Cl. 43—42.06)

This invention relates to an artificial bait or lure particularly intended as an eel jig for striped bass, and has for its object to improve prior constructions so as to give a more lifelike quality to the lure as a whole while in use.

The invention will be described in connection with the accompanying drawings in which.

Figure 1:
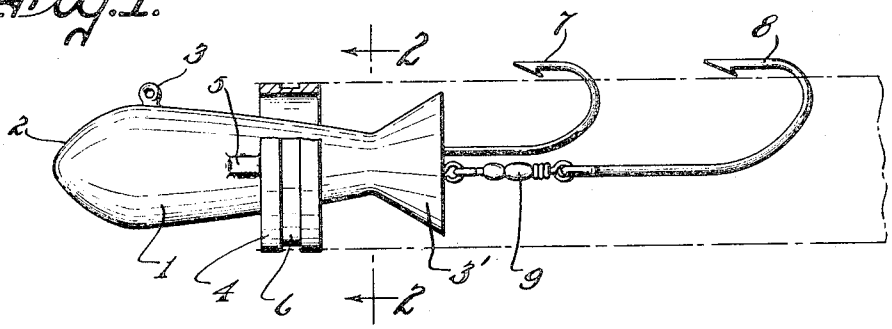
Fig. 1 is a side elevation of the lure partly broken away.

The lure comprises a sinker 1, preferably made of lead, having a rounded nose 2 and an eye 3 to which the line may be attached. This eye is located on the top rather than upon the forward end of the sinker for a purpose to be described. The rear end of the lure is flared outwardly as indicated at 3'. Between the eye and the flared rear end of the sinker a ring 4 is attached as by lugs 5 soldered or otherwise secured to the sinker. The outside surface of this ring is channeled at 6 so that a natural or artificial eel skin drawn over it may be tied in place without closing off the space between the ring and the body of the sinker. One or more hooks are attached to the rear end of the sinker, one hook 7 being preferably rigidly and a hook 8 movably by means of a swivel 9 the forward end of which is fixed in the rear end of the sinker.

In use a natural or artificial eel skin is drawn over the two hooks and tied in the groove 6 and the hooks 7 and 8 are then pulled through the skin so that they project. In use the lure is allowed to settle to the bottom and is kept moving by retrieving the line gradually. Water flows through the spaces between the ring 5 and the body of the sinker and then passes lengthwise through the skin, creating a very realistic eel like motion. By having the eye 3 on the top of the sinker the motion of the lure is kept generally horizontal, rather than being tilted upwardly as it would be were the eye attached to the front end of the sinker. The water flowing within the skin is deflected outwardly by the flared rear end 3' of the sinker so that it presses against the skin to keep the latter inflated and give it greater action. The flexibility of the rear hook 8 due to its swivel connection also assists in creating a lifelike illusion and permits much greater motion of the skin than would be possible were this hook rigidly mounted. The rear hook also will serve for fish making a short strike. The top position of the eye also permits the entire lure to be raised from the bottom while keeping it generally horizontal in position, this being a much more lifelike effect than were the front end of the sinker to be raised into a more or less vertical position by an eye on the front.

Figure 2:
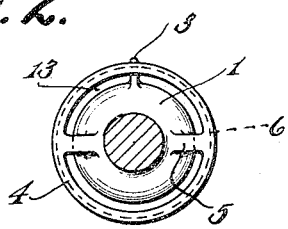
Fig. 2 is a section on line 2—2 of Fig. 1.
Figure 3:
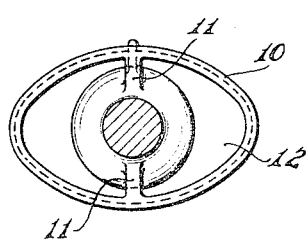
Fig. 3 is a section similar to Fig. 2 but showing a modification.

If it is desired to use the same principle for simulating a squid the ring 4 may be flattened as shown at 10 in Fig. 3 so as to be generally elliptical in shape. An open-ended tube of some flexible material like silk or rubber may be tied in place as with the eel skin previously described. In this case the lugs 11 are preferably arranged at the top and bottom as shown in Fig. 3 instead of being at the sides as in Figs. 1 and 2. The term "annular" will be used to include the space 12 of Fig. 3 as well as the space 13 of Fig. 2.

What I claim is:

A fish lure comprising a sinker having a rounded front end, a rearwardly tapering body, and an outwardly flaring rear end, a line securing eye mounted on the sinker at the side thereof, a ring secured to the body of the sinker and spaced therefrom to provide an annular flow space for water between the ring and said body, said ring being provided with means for the attachment of one end of a tubular skin extending rearwardly around but spaced from the body and the flaring rear end of the sinker, whereby said tubular skin will be maintained inflated and in motion by the water passing between the skin and the sinker and deflected outwardly by said flaring rear end of the sinker, and one or more hooks secured to the rear of the sinker.

FLOYD T. ROMAN.

REFERENCES CITED

The following references are of record in the file of this patent:

UNITED STATES PATENTS

| Number | Name | Date |
|---|---|---|
| 981,454 | Miller et al. | Jan. 10, 1911 |
| 1,232,211 | Burkman | July 3, 1917 |
| 1,620,497 | Sykes | Mar. 8, 1927 |
| 2,230,456 | Henze | Feb. 4, 1941 |